United States Patent [19]
Ricks

[11] Patent Number: 5,941,931
[45] Date of Patent: Aug. 24, 1999

[54] SIMPLIFIED SYSTEM FOR INTEGRATING DISTANCE INFORMATION FROM AN ADDITIONAL NAVIGATION SYSTEM INTO AN EXISTING AIRCRAFT DESIGN

[75] Inventor: Ralph D. Ricks, Huntington Beach, Calif.

[73] Assignee: Rockwell International, Costa Mesa, Calif.

[21] Appl. No.: 08/955,581

[22] Filed: Oct. 22, 1997

Related U.S. Application Data

[63] Continuation of application No. 08/494,276, Jun. 23, 1995, abandoned.

[51] Int. Cl.⁶ .................................................. G06F 13/00
[52] U.S. Cl. .......................... 701/207; 701/213; 701/214
[58] Field of Search ............................... 701/4, 5, 14, 16, 701/200, 206, 207, 211, 213, 214, 223, 300

[56] References Cited

U.S. PATENT DOCUMENTS

| | | |
|---|---|---|
| 4,359,733 | 11/1982 | O'Neill ........................... 343/6.5 LC |
| 5,184,304 | 2/1993 | Huddle ................................... 364/453 |
| 5,193,064 | 3/1993 | Maki ...................................... 364/454 |
| 5,317,514 | 5/1994 | Bancroft et al. ....................... 364/449 |
| 5,382,957 | 1/1995 | Blume ..................................... 342/43 |
| 5,461,388 | 10/1995 | Applegate et al. .................... 342/357 |
| 5,467,274 | 11/1995 | Vax ................................... 364/424.06 |
| 5,504,482 | 4/1996 | Schreder ................................ 340/995 |
| 5,506,588 | 4/1996 | Diefes et al. .......................... 342/357 |
| 5,534,875 | 7/1996 | Diefes et al. .......................... 342/357 |

*Primary Examiner*—William A. Cuchlinski, Jr.
*Assistant Examiner*—Edward Pipala
*Attorney, Agent, or Firm*—Kyle Eppele; James P. O'Shaughnessy

[57] ABSTRACT

A simplified system for integrating a distance measurement derived from an additional navigation system into an existing aircraft design by creation of a Distance integrator function that makes use of existing Distance Measuring Equipment to couple the additional navigation system into the aircraft's display and navigation systems.

20 Claims, 6 Drawing Sheets

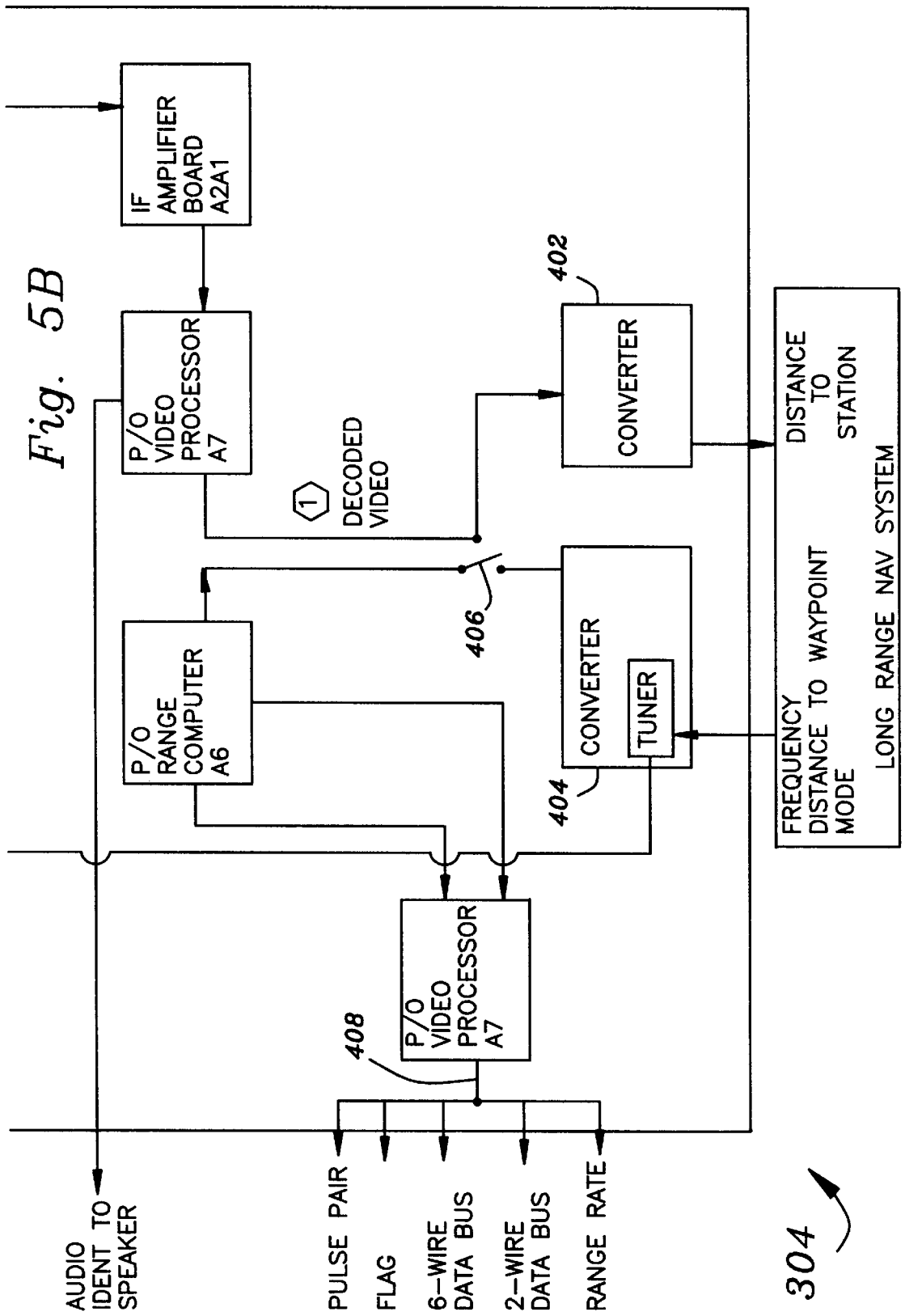

SIMPLIFIED SYSTEM FOR INTEGRATING DISTANCE INFORMATION FROM AN ADDITIONAL NAVIGATION SYSTEM INTO AN EXISTING AIRCRAFT DESIGN

This application is a continuation of application Ser. No. 08/494,276 filed Jun. 23, 1995, now abandoned.

CROSS-REFERENCE TO RELATED APPLICATIONS

This application relates to the following applications:

A SYSTEM FOR INTEGRATING NEW OR ADDITIONAL VERTICAL NAVIGATION SYSTEMS INTO EXISTING AIRCRAFT, having Ser. No. 08/493,955.

A SIMPLIFIED SYSTEM FOR INTEGRATING AN ADDITIONAL NAVIGATION SYSTEM INTO AN EXISTING AIRCRAFT DESIGN, having Ser. No. 08/493,955, AN ENHANCED SYSTEM FOR AN ADDITIONAL NAVIGATION SYSTEM INTO AN EXISTING AIRCRAFT DESIGN WHICH INCLUDES VOICE IDENTIFICATION OF WAYPOINTS, having Ser. No. 08/08,493,955, having at least one of the same inventors, Ralph D. Ricks and assigned to the same assignee, Rockwell International Corporation, and all of which applications are incorporated herein by these references.

FIELD OF THE INVENTION

The present invention generally relates to aerial navigation and more particularly to a system for integrating an additional navigation system into an existing aircraft design and even more particularly relates to a distance data integration scheme which does not require severing the existing, and certified, aircraft wiring.

BACKGROUND

In recent years, avionics engineers have endeavored to enhance the economy and safety of aircraft operations. One example is the recent use of global positioning system (GPS) receivers and Flight Management Systems (FMS) to provide enhanced navigation guidance, with greater accuracy and less reliance on ground based navigational aids. Typically in such systems the information from the FMS is switched into the stream of information normally extending from a Distance Measuring Equipment (DME) interrogator to the instruments which display distance to a station to the pilot and any automatic flight control system.

While this approach does have several beneficial aspects, it has several shortcomings. First of all, it requires severing of the aircraft wiring between the DME interrogator and the instruments. The integrity of these wires is essential to safety of flight in some aircraft. Consequently, any alterations of these wires is regulated by the Federal Aviation Administration (FAA). Secondly, an expensive and/or failure prone electro-mechanical switching device is required. Thirdly, the FMS must have multiple types of distance signals to match the various generations and technologies of aircraft.

Consequently, there exists a need for an improved system for integrating an additional navigation system into an existing aircraft design.

SUMMARY OF THE INVENTION

It is an object of the present invention to provide an economical system for integrating distance information from a new or additional source into existing aircraft design.

It is a feature of the present invention to include an insertion of this new distance information into a DME interrogator system.

It is an advantage of the present invention to reduce alteration of existing aircraft wiring.

It is another advantage of the present invention to reduce the requirement for costly recertification of the aircraft wiring.

It is yet another advantage of the present invention to eliminate the need for multiple, redundant output signal formats from the FMS.

The present invention is a system for integrating distance information from an additional navigation system into an existing aircraft which is designed to satisfy the aforementioned needs, provide the previously stated objects, include the above listed features, and achieve the already articulated advantages. The present invention is a "system with undisturbed wiring", in the sense that the typical alteration of the connecting wires is avoided.

Accordingly, the present invention is a system including, a box, a first distance measuring means located in the box, a second distance measuring means, a display, and a switch disposed in the box for selectively connecting either the first distance measuring means or the second distance measuring means to the display.

BRIEF DESCRIPTION OF THE DRAWINGS

The invention may be more fully understood by reading the following description of a preferred embodiment of the invention, in conjunction with the appended drawings wherein:

FIGS. 5A and 5B are a more detailed block diagrams of a Distance Integrator of FIG. 4.

DETAILED DESCRIPTION

Figure 1:
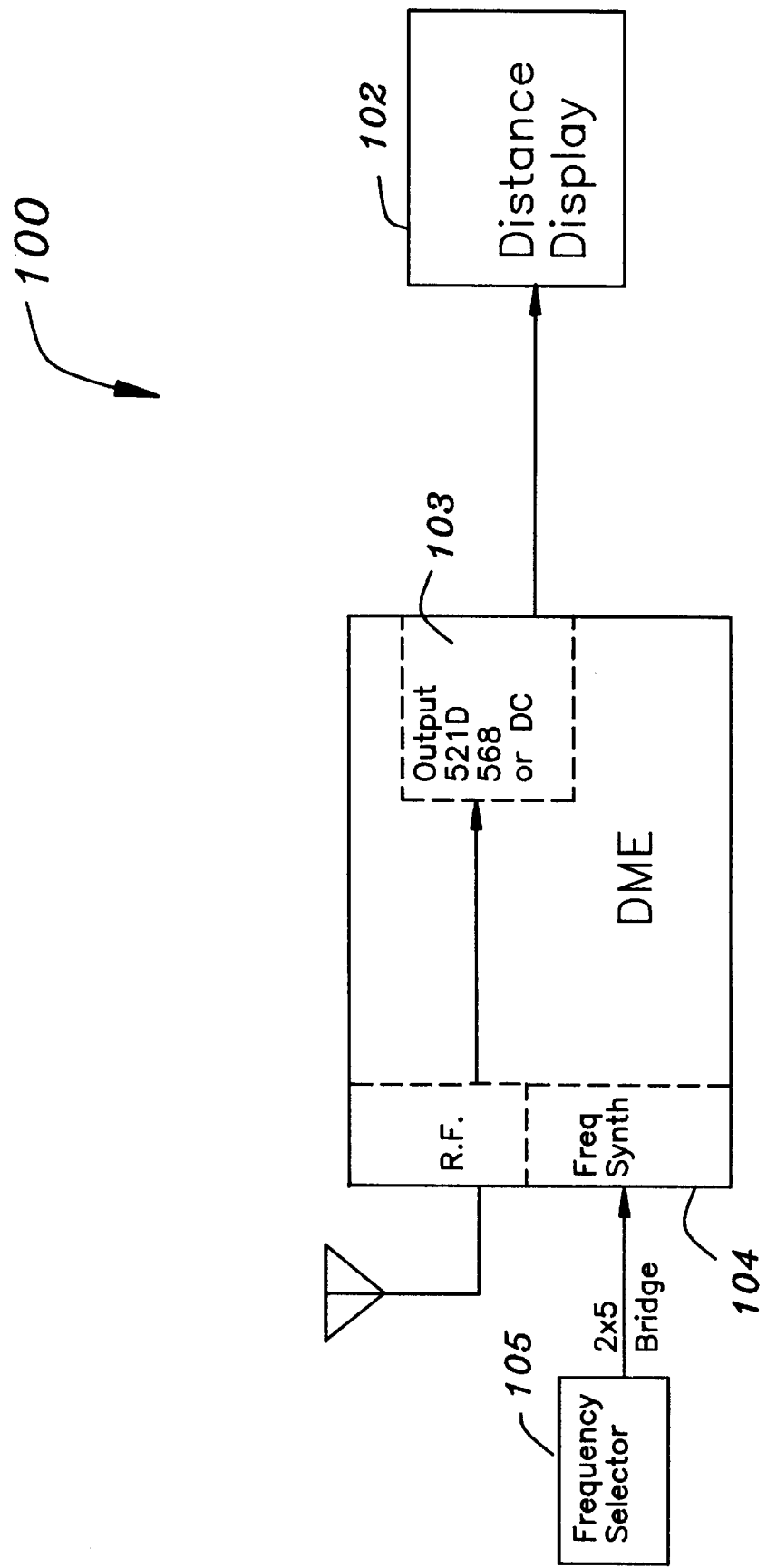
FIG. 1 is a block diagram view of a prior art system which does not include an additional navigation system.

Now referring to the drawings, where like numerals refer to like matter throughout, and more particularly referring to FIG. 1, there is shown a navigation system of the prior art, generally designated 100, which includes a DME 104 and an HSI 102, and frequency selector 105. Included in DME 104 is conversion circuitry 103 for converting electrical pulses representing distance information into signals for interfacing with display 102.

Figure 2:
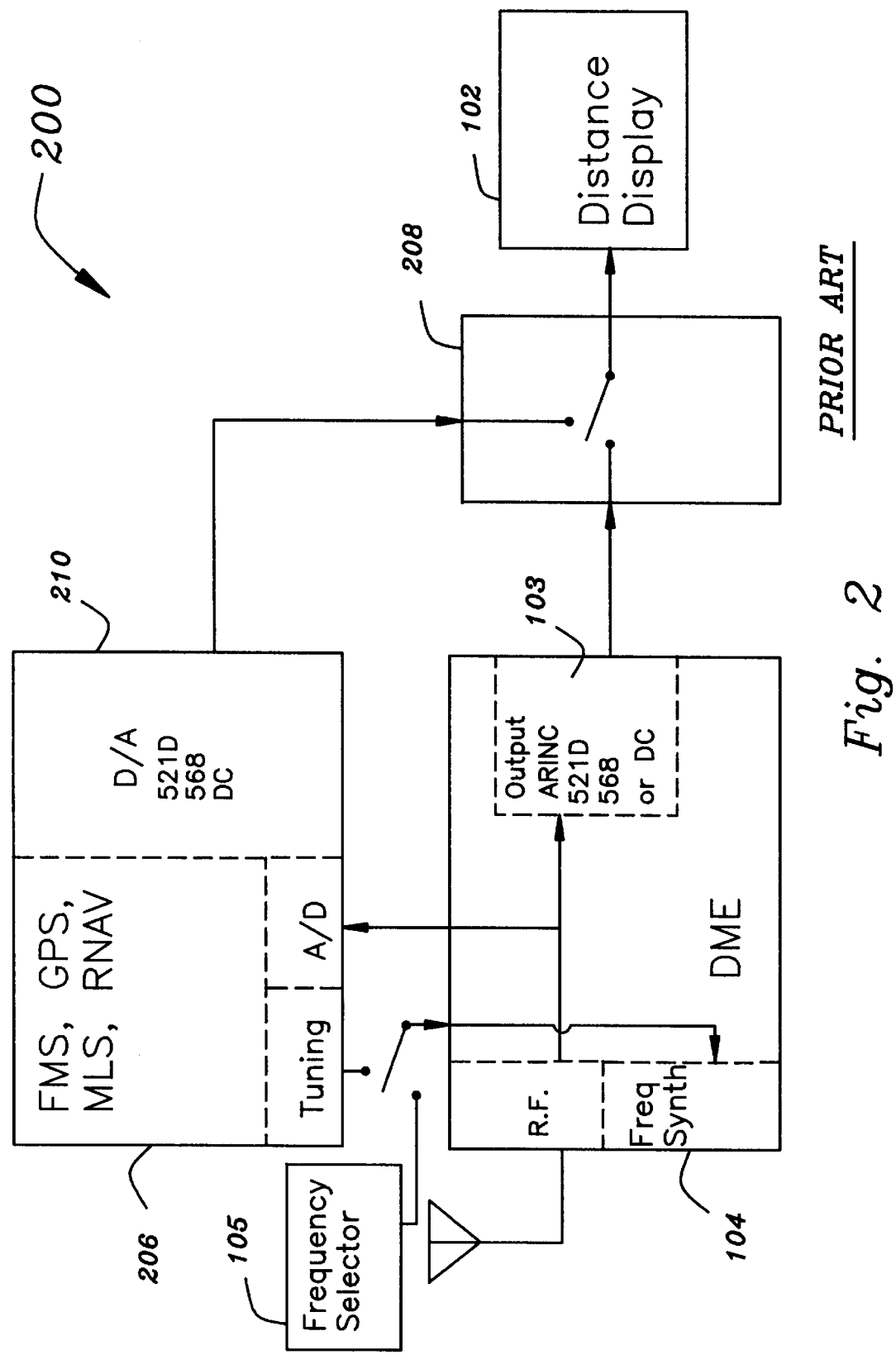
FIG. 2 is block diagram view of a prior art system which has integrated an additional navigation system (FMS) with an existing DME interrogator, and a switching box disposed in the interrupted wiring.

Now referring to FIG. 2, there is shown a navigation system, of the prior art, generally designated 200, including a DME 104, frequency selector 105, distance display 102, an FMS 206 and a switching box 208, which are well known in the art, and a D/A converter 210, which performs the following functions: converting the digital output from FMS 206 into analog or digital signals representing distance to waypoint. This requires severing the aircraft wiring and requiring recertification of the aircraft. FMS 206 may include a GPS receiver, a multi-sensor random area navigation system, and/or a microwave landing system etc. This figure shows only single lines exiting and entering each of the boxes 102, 104, 206 and 208. These single lines are gross simplifications and an actual installation may involve many more wires.

Figure 3:
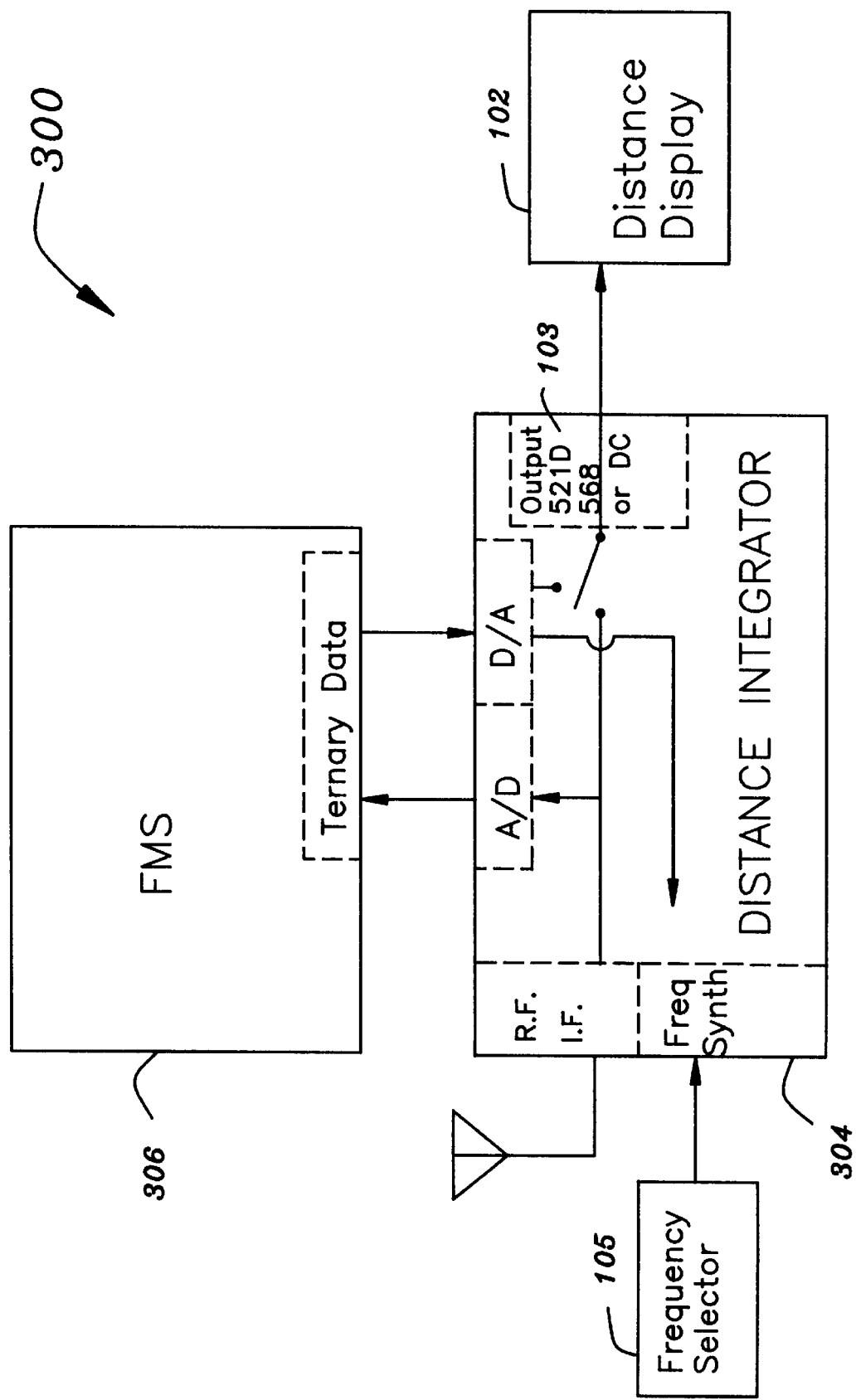
FIG. 3 is a simplified block diagram view of the present invention which shows an FMS integrated through a modified DME interrogator.

Now referring to FIG. 3, there is shown a system, generally designated 300, which includes FMS 306 which is well known in the art. FMS 306 is similar to FMS 206 but with reduced analog circuitry. FMS 306 is shown coupled to Distance Integrator 304, which is coupled to instruments 102 through existing aircraft wiring. Control of tuned frequency is switched between frequency selector 105 and FMS 306 via bits in the ternary data stream from FMS 306.

Figure 4:
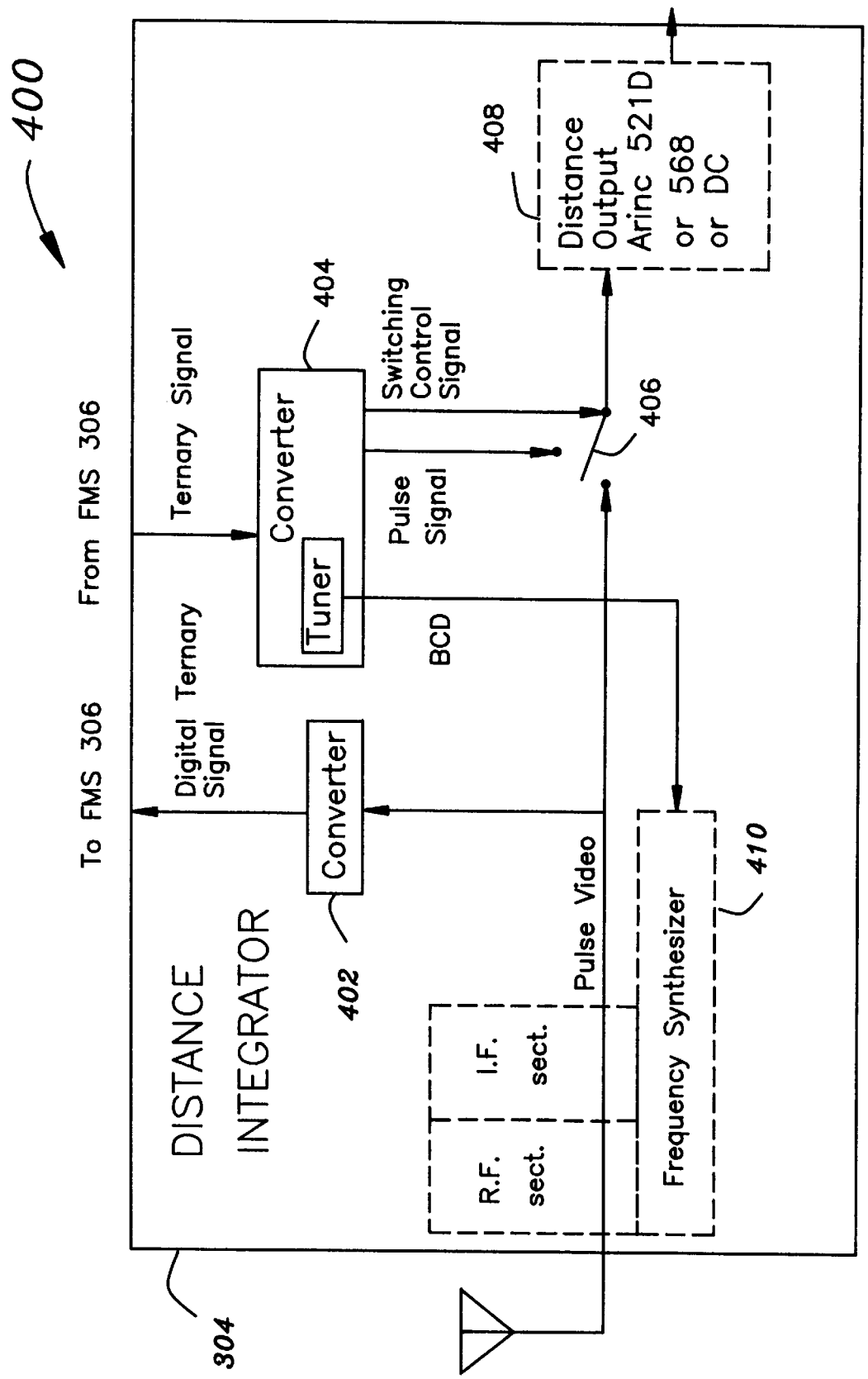
FIG. 4 is a more detailed block diagram one design of a Distance Integrator of FIG. 3.

Now referring to FIG. 4, there is shown, a distance integrator 304 of FIG. 3, which includes many well known components of a prior art DME interrogator but with several additions and modifications. Integrator 304 is coupled to FMS 306 (not shown), through additional converter 402, which converts typical DME pulse signals to digital ternary signals for use in an FMS 306. Integrator 304 receives information from the FMS 306 through additional converter 404, which converts ternary signals to pulse pair signals which are coupled to output 408 through additional switch 406. FMS 306 tunes integrator 304 by means of ternary to BCD frequency selector within converter 404. BCD data representing selected frequency is coupled to frequency synthesizer 410 to provide remote tuning of the conventional DME interrogator component of integrator 304.

In operation, FMS 306 tunes tuning circuit 410. Distance to a DME ground station represented by pulse video is converted to digital ternary data by converter 402 and sent to FMS 306 to aid in position determination. FMS 306 calculates distance to waypoint and sends that information to distance output section 408 via converter 404 and switch 406. Switch 408 is controlled by data within words in the ternary information in converter 404. The point of switching in data from the FMS 306 can be varied within the integrator 304 in many fashions similar to those alternative switching positions described in the Nav integrator of the above referenced patent application entitled A SIMPLIFIED SYSTEM FOR INTEGRATING AN ADDITIONAL NAVIGATION SYSTEM INTO AN EXISTING AIRCRAFT DESIGN.

Figure 5A:
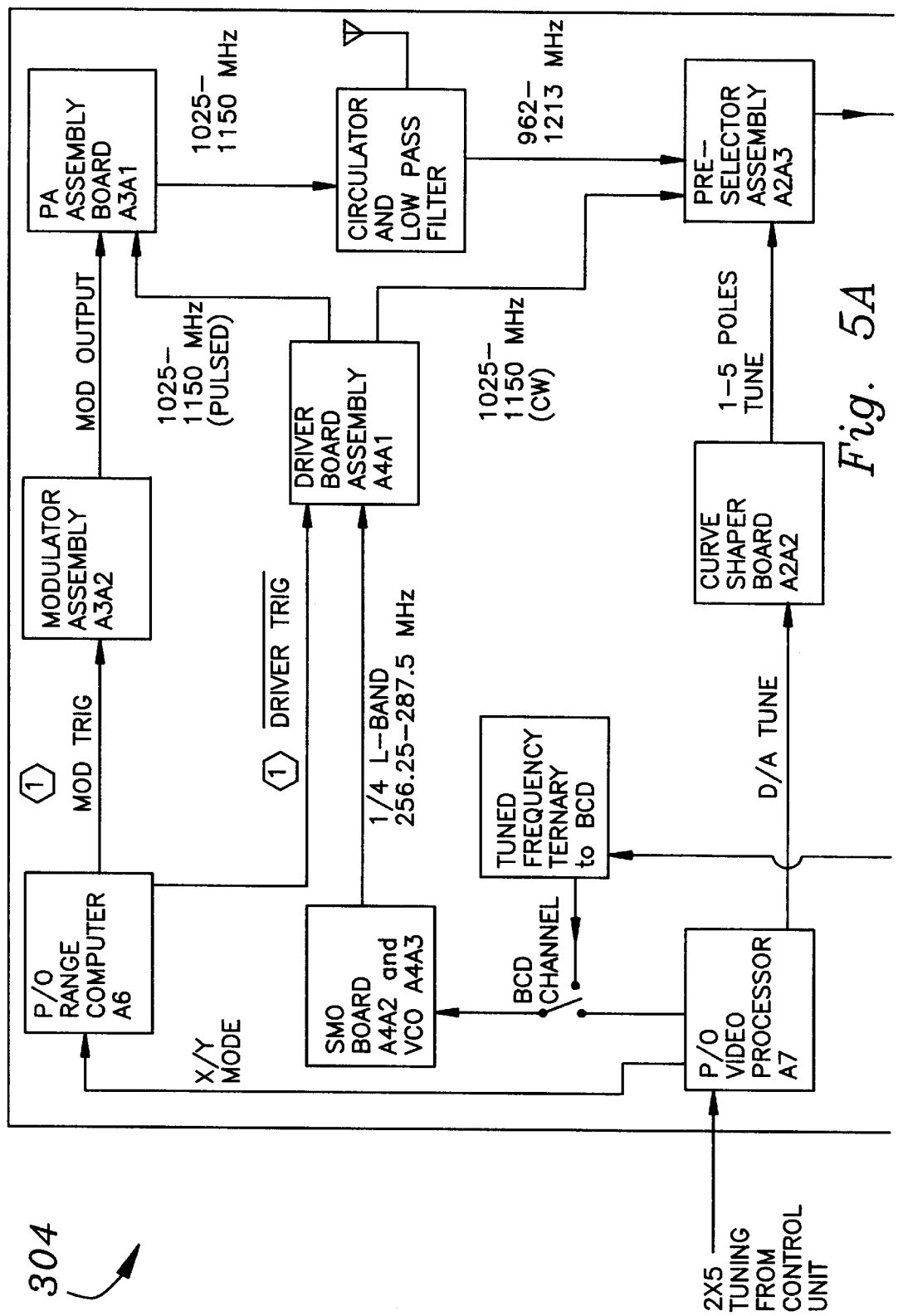

Now referring to FIGS. 5A and 5B there are shown internal views of one embodiment of integrator 304 which shows more detail regarding the modification of an existing DME to arrive at integrator 304. Shown are converters 402 and 404 and switch 406.

It is thought that the system, of the present invention, will be understood from the foregoing description and it will be understood from the foregoing description and it will be apparent that various changes may be made in the form, construction, steps and the arrangement of the parts and steps, without departing from the spirit and scope of the invention or sacrificing all of their maternal advantages, the form herein being merely preferred or exemplary embodiments thereof.

I claim:

1. A distance measuring system for use in aircraft comprising:
   an antenna affixed to an aircraft;
   a distance integrator unit on-board said aircraft electronically coupled to the antenna;
   a frequency selector coupled to the distance integrator unit for selecting a desired frequency for tuning to signals broadcast from a ground transmitter;
   a flight management system on-board the aircraft and coupled to the as distance integrator unit having both an input signal from the distance integrator unit and an output signal thereto;
   a switch within the distance integrator unit having a control signal from the flight management system and data input signals from the distance integrator unit and the flight management system; and
   a display unit coupled to the distance integrator unit switch output signal.

2. The system of claim 1, wherein the distance integrator unit comprises a distance measurement equipment (DME) unit.

3. The system of claim 1, wherein the distance integrator unit comprises a global position system receiver.

4. The system of claim 1, wherein the distance integrator unit comprises a microwave landing system.

5. The system of claim 1, wherein the output signals and input signals coupled between the flight management system and the distance integrator unit are ternary in nature.

6. The system of claim 1, wherein the distance integrator unit switch output signal coupled to the display is compliant with ARINC standard 521D.

7. The system of claim 1, wherein the distance integrator unit switch output signal coupled to the display is compliant with ARINC standard 568.

8. The system of claim 1, wherein the distance integrator unit comprises a random area navigation system unit.

9. A distance measuring system for avionics applications comprising:
   an antenna affixed to an aircraft;
   a distance integrator unit on-board said aircraft coupled to the antenna;
   a frequency selector coupled to the distance integrator unit for selecting a frequency for tuning to signals broadcast from a ground transmitter;
   a flight management system on-board the aircraft and coupled to the distance integrator unit having both an input signal from the distance integrator unit and an output signal thereto;
   a switch within the distance integrator unit, having a control signal from the flight management system and data input signals from the distance integrator and the flight management system;
   a first converter disposed between and coupled to the measuring unit within the distance integrator unit and said switch;
   said first converter receiving a pulse video signal as an input signal and converting said pulse video signal into a ternary digital signal, said ternary digital signal coupled to said flight management system as an input signal;
   a second converter disposed between and coupled to the measuring unit within the distance integrator unit and said switch;
   said second converter receiving a digital ternary signal from said flight management system and generating a first output signal to control tuning of said distance measuring unit within the distance integrator unit, a second signal representative of distance data, coupled to said switch and a third signal coupled to said switch for controlling the operation at the switch; and
   a display unit coupled to the distance integrator unit switch output signal.

10. The system of claim 9, wherein the distance integrator unit comprises a distance measurement equipment (DME) unit.

11. The system of claim 9, wherein the distance integrator unit comprises a global position system receiver.

12. The system of claim 9, wherein the distance integrator unit comprises a microwave landing system.

13. The system of claim 9, wherein the output signals and input signals coupled between the flight management system and the distance integrator unit are ternary in nature.

14. The system of claim 9, wherein the distance integrator unit switch output signal coupled to the display is compliant with ARINC standard 521D.

15. The system of claim 9, wherein the distance integrator unit switch output signal coupled to the display is compliant with ARINC standard 568.

16. The system of claim 9, wherein the distance integrator unit comprises a random area navigation system unit.

17. The system of claim 9, wherein the first output signal of said second converter is of the type referred to as a BCD type signal.

18. The system of claim 9, wherein the second output signal of said second converter is a pulse type signal.

19. The system of claim 9, wherein the first converter is an analog to digital converter.

20. The system of claim 9, wherein the second converter is a digital to analog converter.

* * * * *